(12) United States Patent
Buchholz

(10) Patent No.: US 9,512,887 B2
(45) Date of Patent: Dec. 6, 2016

(54) HYBRID DRIVE

(71) Applicant: BorgWarner Inc., Auburn Hills, MI (US)

(72) Inventor: Thomas Buchholz, Stockach (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/375,918

(22) PCT Filed: Jan. 29, 2013

(86) PCT No.: PCT/US2013/023553
§ 371 (c)(1),
(2) Date: Jul. 31, 2014

(87) PCT Pub. No.: WO2013/119413
PCT Pub. Date: Aug. 15, 2013

(65) Prior Publication Data
US 2014/0360835 A1 Dec. 11, 2014

(30) Foreign Application Priority Data

Feb. 8, 2012 (EP) .................................. 12000810

(51) Int. Cl.
*F16D 48/02* (2006.01)
*F16D 35/02* (2006.01)
*F16D 35/00* (2006.01)

(52) U.S. Cl.
CPC ............ *F16D 25/14* (2013.01); *F16D 35/028* (2013.01); *F16D 35/00* (2013.01)

(58) Field of Classification Search
CPC .............................. F16D 35/028; F16D 35/00

USPC .................... 192/58.43, 58.5, 58.6
See application file for complete search history.

(56) References Cited

U.S. PATENT DOCUMENTS

| 3,458,020 A | 7/1969 | Lutz |
| 3,688,884 A | 9/1972 | Perrin et al. |
| 4,346,797 A | 8/1982 | Bopp |
| 4,966,265 A | 10/1990 | Wiese et al. |

(Continued)

FOREIGN PATENT DOCUMENTS

| DE | 19749342 | 6/1999 |
| DE | 19749342 A1 | 6/1999 |

(Continued)

*Primary Examiner* — Mark Manley
(74) *Attorney, Agent, or Firm* — Harness, Dickey & Pierce, P.L.C.; John A. Artz PC

(57) ABSTRACT

The invention relates to a fluid friction clutch (1) having a housing (2, 3), having a clutch disk (4) which is rotatable relative to the housing (2, 3), and which is rotatably arranged on an end (5) of a shaft (6) which is mounted centrally within the housing (2, 3); having a working chamber (9) between the housing (2, 3) and the clutch disk (4); having a storage chamber (10) for clutch fluid; having a supply duct (11) which leads from the storage chamber (10) to the working chamber (9); having a stationary clutch part (13) relative to which the housing (2, 3) is rotatable; and having a pump element (14), wherein the pump element (14) defines a shear gap (12) with an annular wall (19) arranged in the storage chamber (10), wherein an active element (7) is fastened to the housing (2, 3), and wherein the shear rate in the shear gap (12) can be regulated by means of an electric motor (20) which is mounted on the shaft (6).

17 Claims, 4 Drawing Sheets

(56) References Cited

U.S. PATENT DOCUMENTS

| | | |
|---|---|---|
| 5,931,273 A | 8/1999 | Moser |
| 5,981,151 A | 11/1999 | Leenders et al. |
| 6,026,943 A | 2/2000 | Fuchs et al. |
| 6,443,283 B1 | 9/2002 | Augenstein et al. |
| 7,178,656 B2 | 2/2007 | Pickelman et al. |
| 8,875,861 B2 | 11/2014 | Buchholz et al. |
| 2003/0006117 A1 | 1/2003 | Tilly et al. |
| 2003/0133242 A1 | 7/2003 | Buchholz |
| 2004/0011306 A1 | 1/2004 | Liederman et al. |
| 2005/0023100 A1 | 2/2005 | Buchholz et al. |
| 2009/0127051 A1 | 5/2009 | Buchholz |
| 2012/0138409 A1* | 6/2012 | Buchholz ................ F16D 35/02 192/58.5 |
| 2012/0255714 A1* | 10/2012 | Roby ..................... F01P 7/042 165/121 |
| 2013/0313062 A1 | 11/2013 | Buchholz |

FOREIGN PATENT DOCUMENTS

| | | |
|---|---|---|
| EP | 0135827 A1 | 4/1985 |
| EP | 1731787 | 6/2006 |
| EP | 1731787 A1 | 12/2006 |
| GB | 1576736 A | 10/1980 |
| JP | H09210102 A | 8/1997 |
| JP | 2002-276363 | 9/2002 |
| JP | 2004-156780 | 10/2003 |
| JP | 2006046658 A | 2/2006 |
| KR | 1019980033441 | 3/1999 |
| KR | 10-0908396 | 10/2008 |
| WO | WO-2006/131157 A1 | 12/2006 |
| WO | WO-2008/080159 A1 | 7/2008 |
| WO | WO-2011/019527 A2 | 2/2011 |
| WO | WO2011/047268 * | 4/2011 |

* cited by examiner

HYBRID DRIVE

This application is a national phase application based on PCT/US2013/023553 filed Jan. 29, 2013, which claims priority from European Application No. 12000810.7, filed Feb. 8, 2012, the content of all of which is incorporated herein by reference in their entirety.

TECHNICAL FIELD

The invention relates to a fluid friction clutch.

BACKGROUND

A fluid friction clutch of said type is known from EP 1 731 787 B1, the content of disclosure of which is hereby incorporated by explicit reference to the content of disclosure of the present application.

DE 197 49 342 A1 discloses a viscous clutch for driving motor vehicle air-conditioning compressors, in which, to control the filling level of fluid in a working chamber, the throughput of fluid through the pipe section adjoining an inlet section of a scoop pipe is controlled by means of a valve. Tests carried out within the context of the invention have, however, revealed that such a valve causes problems in that it is extremely difficult to achieve acceptable performance results.

It is therefore an object of the present invention to provide a fluid friction clutch, by means of which it is possible in a simple manner, without using a valve, to achieve a variable clutch fluid flow.

SUMMARY OF THE INVENTION

By means of the provision of a pump element which defines a shear gap with an annular wall in the storage chamber, it is made possible in a simple manner, by utilizing a rotational speed difference between the pump element and the annular wall or the primary side of the fluid friction clutch, to generate a variable volume flow from the storage chamber into the working chamber, without it being necessary for this purpose to additionally integrate a controllable valve into the flow path.

The particular advantages of the fluid friction clutch according to the invention include firstly that only a small quantity of clutch fluid is required, because on account of the above-explained arrangement, an active feed pump is formed in the oil reservoir, which with regard to the clutch fluid quantity is advantageous over the known utilization of centrifugal forces for filling the working chamber.

Furthermore, the response behavior of the fluid friction clutch according to the invention is faster on account of the smaller clutch fluid component.

An extremely compact design is also obtained because the outer diameter of the storage chamber or of the reservoir can be made larger than the inner diameter of the working chamber.

The compact design is improved further in that, as already explained above, a variability of the clutch fluid flow is made possible without the use of a valve arrangement.

The pump element, which builds up a pressure, with a volume flow being generated as a result of friction of the clutch fluid in the shear gap which is preferably kept small, can be connected either to the electric motor or the clutch disk. If the pump element is connected to the electric motor, for which purpose a control shaft is preferably provided, the annular wall arranged in the storage chamber is connected to the clutch disk.

Alternatively, it is possible to couple the annular wall, preferably via a control shaft, to the electric motor and accordingly to connect the pump element to the clutch disk.

The active element (for example pump wheel, impeller, air compressor etc.) is fastened to the housing.

BRIEF DESCRIPTION OF THE DRAWINGS

Further details, advantages and features of the present invention will emerge from the following description of exemplary embodiments with reference to the drawing, in which.

DESCRIPTION OF THE PREFERRED EMBODIMENTS

Figure 1:
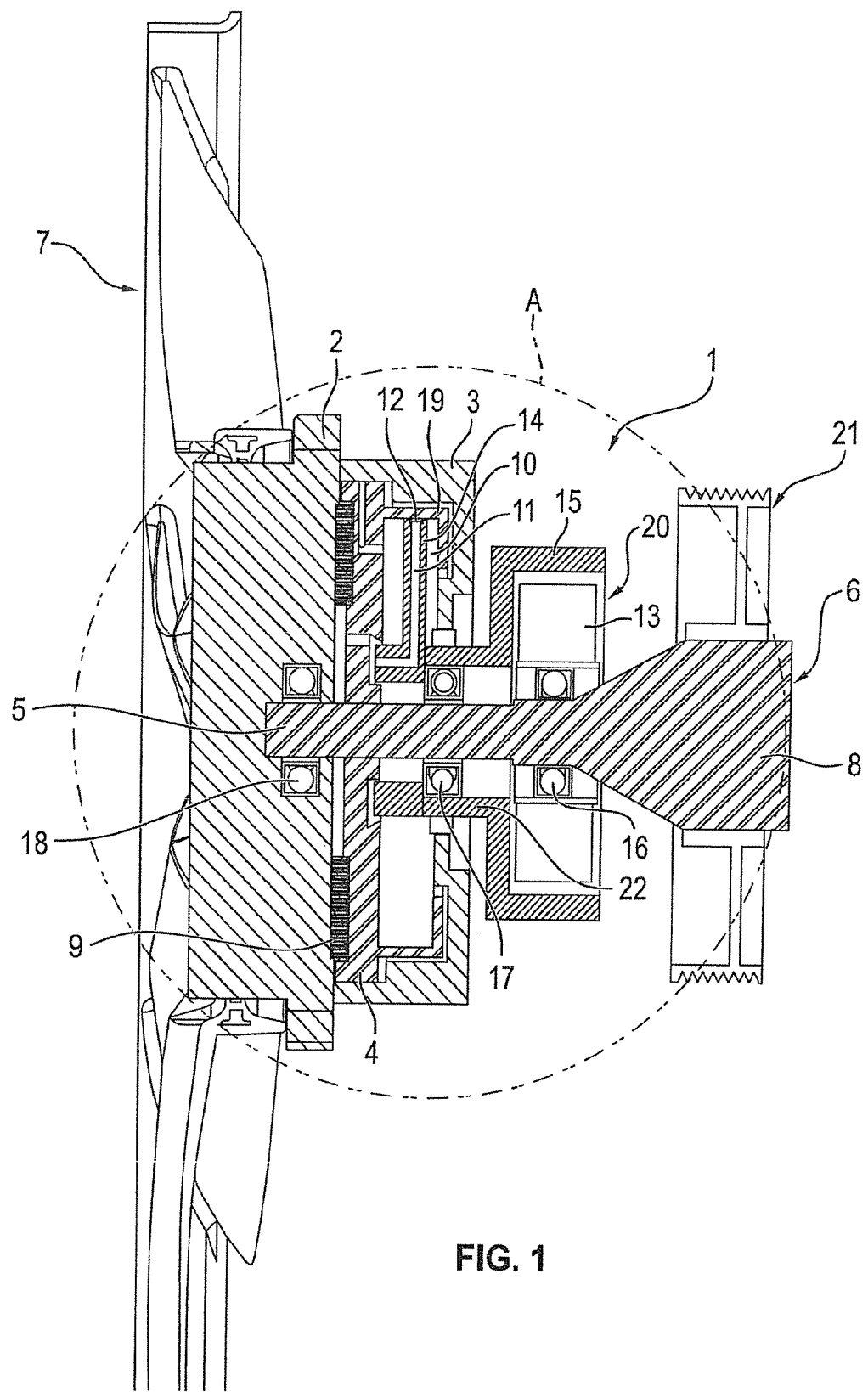
FIG. 1 shows a schematically simplified basic representation of a fluid friction clutch according to the invention.

In FIG. 1 there is illustrated a simplified diagrammatic representation of a fluid friction clutch 1 according to the invention which has a housing which is constructed in the conventional manner from a cover 2 and a housing body 3.

Arranged in the housing 2, 3 is a clutch disk 4 which is rotatable relative to the housing 2, 3. Here, the clutch disk 4 is rotationally fixedly arranged on an end 5 of a shaft 6 which is mounted centrally within the housing 2, 3. Fixed to the housing body 3 is a drivable active element 7 which is illustrated in schematically simplified form and which may be designed for example as a pump wheel or as an impeller.

A working chamber 9 is arranged between the housing body 2 and the clutch disk 4, which working chamber has working gaps which make a transmission of torque possible on account of a shear action on the clutch fluid supplied to the working chamber 9.

Furthermore, a storage chamber 10 for said clutch fluid is provided, with a supply duct 11 leading from the storage chamber 10 to the working chamber 9.

A drive element 21, such as for example a belt pulley, is arranged at the other end 8 of the shaft 6. The fluid friction clutch 1 further has a stationary clutch part 13 which is mounted on the shaft 6 by a bearing 16 and which forms the stator of an electric motor 20 which further comprises a rotor 15.

Figure 2:
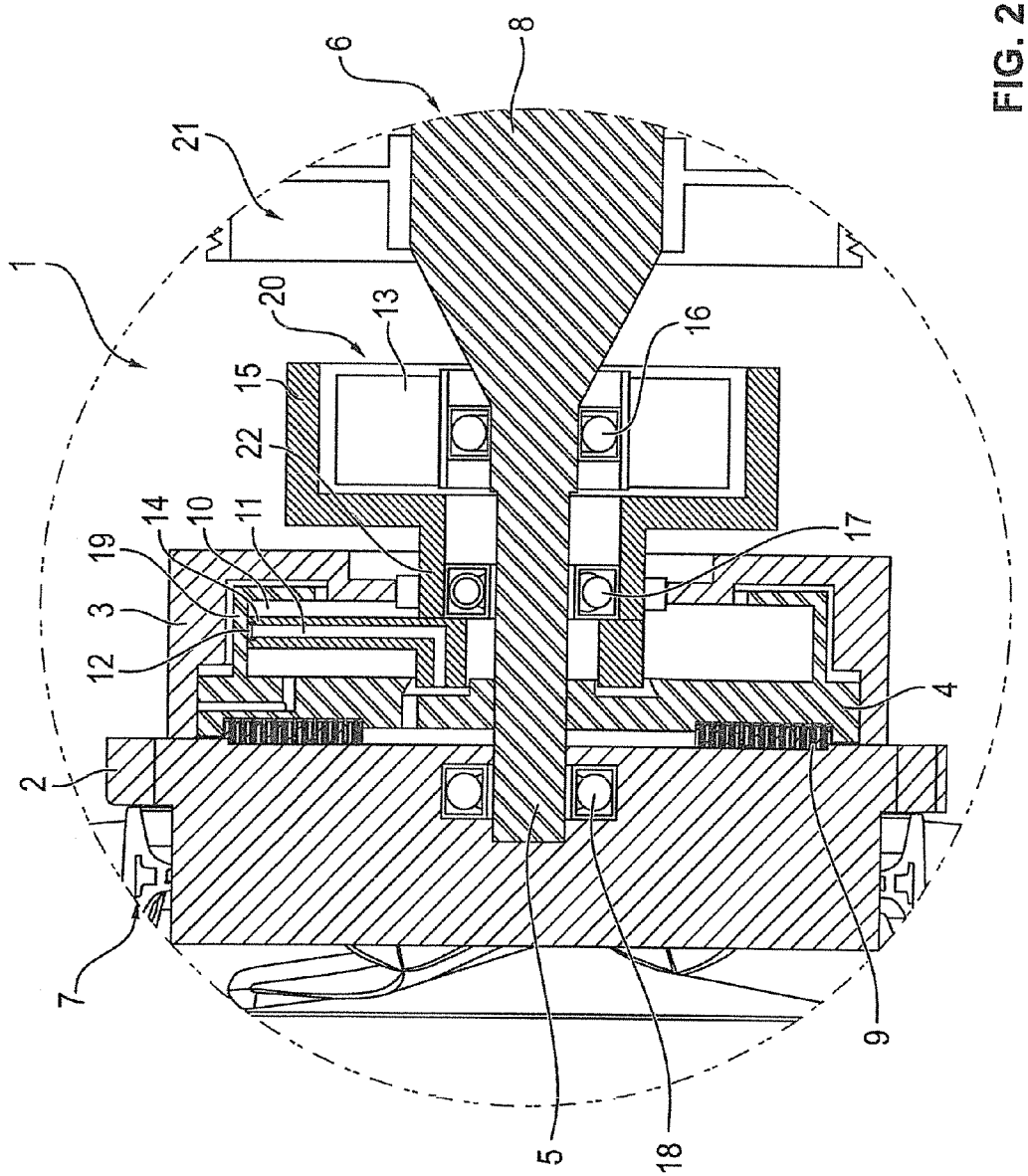
FIG. 2 shows a schematically simplified representation of the detail A in FIG. 1.

As is further shown by a juxtaposition of FIGS. 1 and 2, the friction clutch 1 according to the invention is distinguished by the provision of a pump element 14 which, in the example illustrated, defines at its radial outer edge a shear gap 12 with an annular wall 19.

As the embodiments according to FIGS. 1 and 2 show, the pump element 14 is coupled via a control shaft 22 to the electric motor 20. The annular wall 19 is connected to the clutch disk 4 which is rotationally fixedly mounted on the end 5 of the shaft 6. This means that in this embodiment the pump element 14 can be regulated or controlled in its rotational speed by means of the electric motor 20, whereas the annular wall 19 runs round at the rotational speed of the clutch disk 4.

In order to mount the control shaft 22, there is provided a bearing 17 which guides the control shaft 22 relative to the shaft 6.

The stator 13 is mounted on the shaft 6 by a bearing 16.

Figure 3:
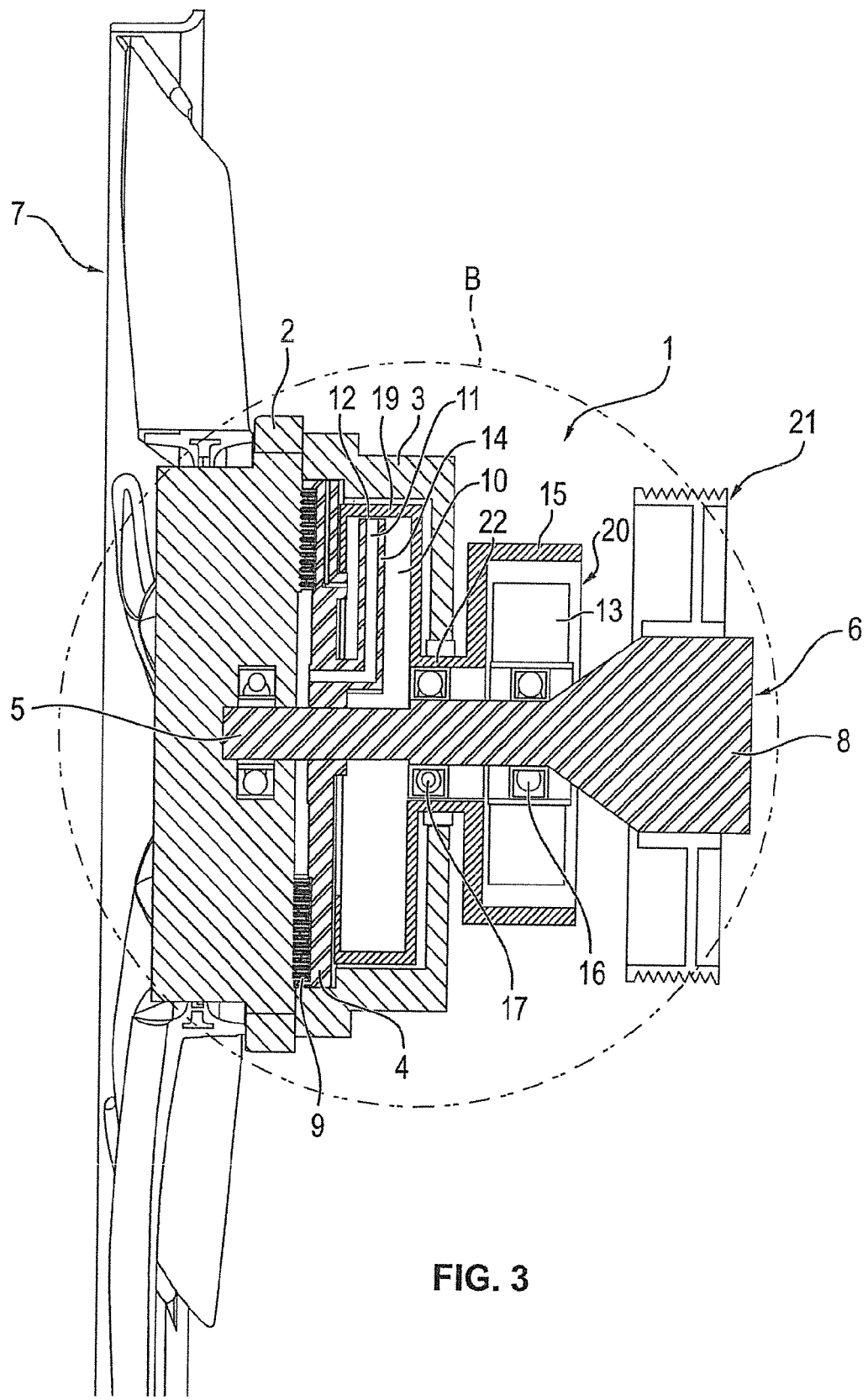
FIG. 3 shows a basic representation, corresponding to FIG. 1, of a second embodiment.
Figure 4:
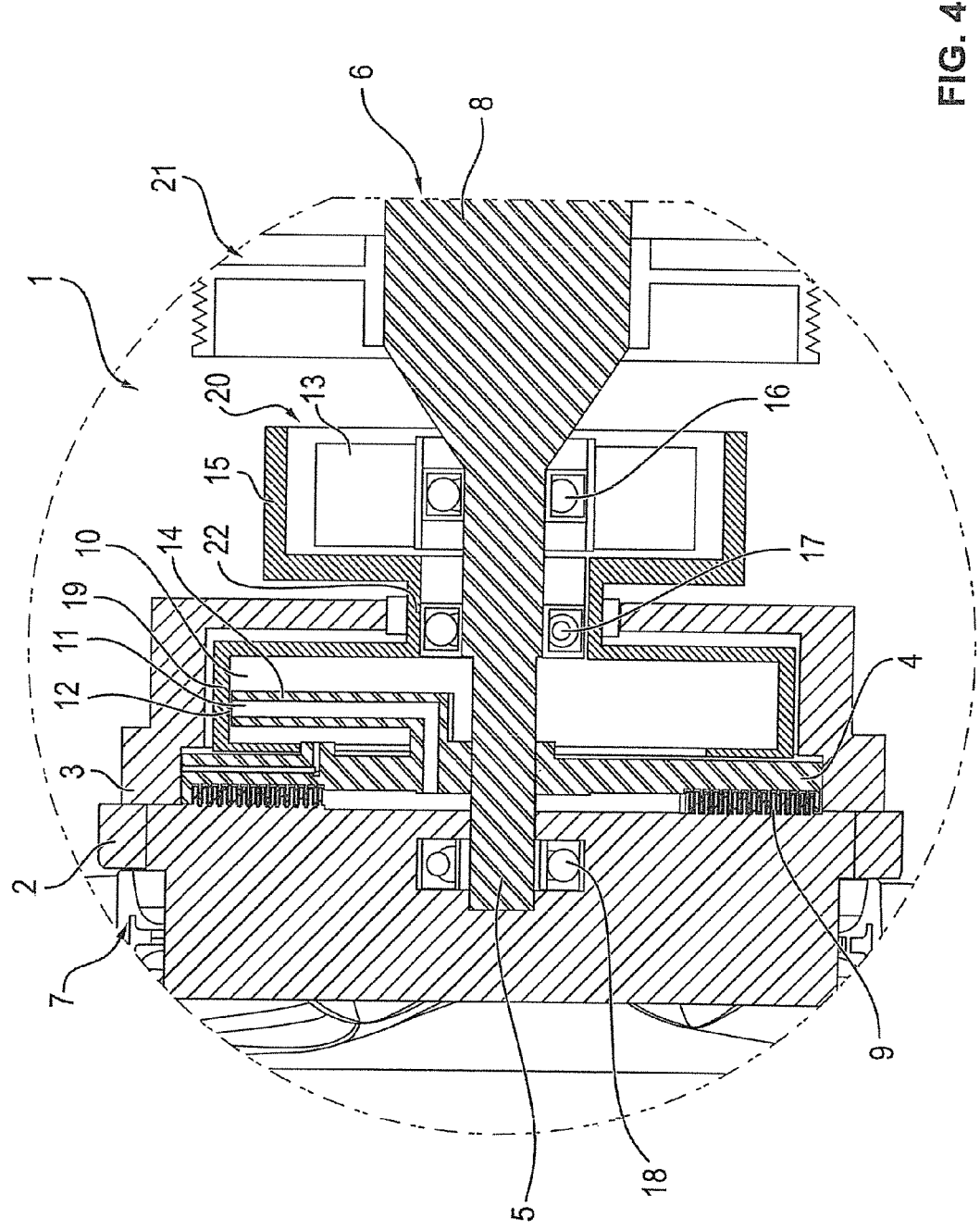
FIG. 4 shows a detail representation, corresponding to FIG. 2, of the detail B in FIG. 2.

A juxtaposition of FIGS. 3 and 4 reveals the construction and the mode of operation of the second embodiment of the fluid clutch 1 according to the invention. All parts which correspond to those of the embodiment according to FIGS. 1 and 2 are denoted by the same reference signs, and therefore reference can be made in this respect to the above description.

By contrast with the embodiment according to FIGS. 1 and 2, in the embodiment according to FIGS. 3 and 4 the annular wall 19 is coupled via a control shaft 22 to the electric motor 20, while the pump element 14 is connected to the clutch disk 4. This means that in this embodiment the annular wall 19 can be controlled or regulated in its rotational speed by means of the electric motor 20, whereas the pump element 14 runs around at the rotational speed of the clutch disk 4.

What both embodiments have in common is that the shear rate in the shear gap 12 can be regulated by means of the electric motor 20. This results in the initially explained particular advantages of the two embodiments according to FIGS. 1 and 2, and 3 and 4.

In addition to the written disclosure of the invention, reference is hereby explicitly made, in order to complete the disclosure, to the diagrammatic representation in FIGS. 1 to 4.

While preferred embodiments of the present invention have been shown and described herein, numerous variations and alternative embodiments will occur to those skilled in the art. Accordingly, it is intended that the invention is not limited to the preferred embodiments described herein but instead limited to the terms of the appended claims.

The invention claimed is:

1. A hybrid drive comprising:
   a housing;
   an active member attached to said housing;
   a shaft member rotatably positioned in said housing;
   a clutch disk positioned in said housing and connected to said shaft member and rotatable at input speed;
   a working chamber between said housing and said clutch disk;
   a storage chamber for clutch fluid, said storage chamber comprising a plurality of first wall members;
   an electric motor with a stator member and a rotatable rotor member;
   a pump element positioned in said storage chamber and having a supply duct leading to said working chamber;
   a second wall member separate from said plurality of first wall members and positioned in said storage chamber, said second wall member connected to said clutch disk and rotatable therewith;
   said pump element connected to said rotatable rotor member and rotatable therewith; and a shear gap in said storage chamber positioned between said second wall member;
   wherein the shear rate of clutch fluid in the shear gap is regulated by said electric motor.

2. The hybrid drive as described in claim 1 wherein said active member is a fan member.

3. A hybrid drive comprising:
   a housing;
   a shaft received in said housing and rotatable about a rotary axis;
   a clutch disk received in said housing and coupled to said shaft for rotation therewith, said clutch disk and said housing cooperating to define a working chamber therebetween;
   an electric motor having a stator that is rotatable relative to said clutch disk and said housing;
   a clutch fluid reservoir coupled to one of said clutch disk and said rotor for rotation therewith, said clutch fluid reservoir comprising a circumferential wall member that extends about the rotary axis; and
   a pump element positioned in said clutch fluid reservoir and coupled to the other one of said clutch disk and said rotor for rotation therewith, the pump element having a pump output that is in fluid communication with said working chamber;
   wherein a shear gap is disposed in said clutch fluid reservoir between said pump element and said circumferential wall member.

4. The hybrid drive of claim 3, further comprising an active member coupled to the housing for rotation therewith.

5. The hybrid drive of claim 4, wherein said active member is a fan member.

6. The hybrid drive of claim 3, wherein the clutch fluid reservoir further comprises a pair of annular wall members that are coupled to opposite axial ends of the circumferential wall member.

7. A hybrid drive comprising:
   a housing that is rotatable about a rotary axis, the housing having a cavity and a plurality of first concentric channels;
   a shaft that is received in the housing and rotatable about the rotary axis;
   a clutch disk received in the housing and coupled to the shaft for rotation therewith, the clutch disk having an annular disk portion and a reservoir portion that extends from the disk portion, the reservoir portion at least partly forming a pump reservoir, the annular disk portion having a plurality of second concentric channels, a return conduit, and a supply conduit, the plurality of second concentric channels cooperating with the first concentric channels to form a working chamber, the return conduit coupling the reservoir with a radially outer side of the working chamber, the supply conduit being fluidly coupled to the working chamber at a location that is radially inward of a radially outward-most end of the return conduit;
   a pump element received in the reservoir and rotatable about the rotary axis relative to the clutch disk, the shaft and the housing, the pump element having a pump outlet that is in fluid communication with the supply conduit; and
   an electric motor having a rotor that is drivingly coupled to the pump element.

8. The hybrid drive of claim 7, wherein a shear gap is defined between the pump element and the reservoir portion of the clutch disk.

9. The hybrid drive of claim 7, wherein the annular disk portion defines an annular groove into which the pump element is received, and wherein an end of the supply conduit opposite the working chamber intersects the annular groove.

10. The hybrid drive of claim 7, wherein a bearing supports the rotor on the shaft for relative rotation.

11. The hybrid drive of claim 7, further comprising a fan coupled to the housing for common rotation.

12. The hybrid drive of claim 7, further comprising a pulley coupled to the shaft for common rotation.

13. A hybrid drive comprising:
a housing that is rotatable about a rotary axis, the housing having a cavity and a plurality of first concentric channels;
a shaft that is received in the housing and rotatable about the rotary axis;
a reservoir received in the cavity and rotatable about the rotary axis relative to the housing and the shaft;
a clutch disk received in the housing and coupled to the shaft for rotation therewith, the clutch disk having an annular disk portion with a plurality of second concentric channels, a return conduit, and a supply conduit, the plurality of second concentric channels cooperating with the first concentric channels to form a working chamber, the return conduit coupling the reservoir with a radially outer side of the working chamber, the supply conduit being fluidly coupled to the working chamber at a location that is radially inward of a radially outward-most end of the return conduit;
a pump element received in the reservoir and coupled to the clutch disk for rotation therewith, the pump element having a pump outlet that is in fluid communication with the supply conduit; and
an electric motor having a rotor that is drivingly coupled to the reservoir.

14. The hybrid drive of claim 13, wherein a shear gap is defined between the pump element and the reservoir.

15. The hybrid drive of claim 13, wherein a bearing supports the reservoir on the shaft for relative rotation.

16. The hybrid drive of claim 13, further comprising a fan coupled to the housing for common rotation.

17. The hybrid drive of claim 13, further comprising a pulley coupled to the shaft for common rotation.

* * * * *